Patented Sept. 20, 1932

1,878,013

UNITED STATES PATENT OFFICE

KARL STAIB, OF BITTERFELD, GERMANY, ASSIGNOR TO THE FIRM I. G. FARBENINDUSTRIE AKTIENGESELLSCHAFT, OF FRANKFORT-ON-THE-MAIN, GERMANY

PRODUCTION OF ANHYDROUS METAL CHLORIDES

No Drawing. Application filed June 21, 1927, Serial No. 200,499, and in Germany August 13, 1926.

This invention relates to the production of anhydrous metal chlorides. In my copending application Ser. No. 107,269 now Patent No. 1,749,854 issued Mar. 11, 1930, I have described a process for producing anhydrous magnesium chloride by chlorinating oxygenated magnesium compounds at elevated temperatures which process substantially consists in admixing carbonizable and volatilizable substances with the oxygenated magnesium compounds when agglomerating the latter, said substances producing pores in the course of the heating operation in such a manner that, considering the distribution of the constituents in the mixture, sufficient free space is produced by the pores to permit of the enlargement of volume connected with the transformation of the oxygenated magnesium compounds to solid magnesium chloride.

Now my further investigations have shown that this method of operating may be applied to oxygenated compounds of other metals, not only to the production of the corresponding fixed chlorides such as calcium chloride, but also of anhydrous chlorides volatile at the temperature of formation, such as $BeCl_2$, $AlCl_3$, $FeCl_3$, $TiCl_4$ &c., or of their mixtures.

Although this transformation of the oxides to the corresponding chlorides in presence of carbon as reducing agent is an exothermic reaction, the attempts hitherto made to make this transformation a continuous and industrially available one, starting from any natural material and merely utilizing the reaction heat, have not been successful. This want of success is due to the same cause to which in my copending application, Ser. No. 107,269 the incomplete transformation of magnesia to solid magnesium chloride was attributed. The rapid proceeding of the reaction from without to the interior of the briquetted material is prevented by the spatial conditions, the oxides requiring for being transformed to chlorides a considerably larger space than they themselves occupy. For instance, 1 molecule of $Al_2O_3$ requires about the fourfold of its own volume for being converted to 2 molecules of $AlCl_3$. As long as this volume is not available, the final product itself when formed from oxids contained within an inert material will obstruct the transformation and only partial conversion will take place.

Now I have found that the desired result is obtained by forming the oxides to be treated (or the material containing the same) into balls, bars or the like with the addition of a voluminous carbonaceous matter, such as peat, sawdust or the like as a reducing agent, and then drying and carbonizing the bodies at an appropriate temperature. When the extremely porous bodies thus obtained (the size of which may be regulated at will) are preheated to about 100–200° C. and exposed to a current of chlorine in a shaft furnace, the maximum surface of attack is offered to the chlorine gas and the reaction is initiated at once and simultaneously at the outer surface and in the interior of the bricks. The heat produced by the exothermic reaction increases the temperature of the brick whereby again the velocity of reaction is increased without, however, being allowed to reach the fusing temperature. The reactivity of the shaped bodies thus produced is so considerable that the chlorine gas is vehemently absorbed. The chlorination may now continuously and rapidly be accomplished, the chlorine and the charge passing either in direct current or in countercurrent, without any chlorine escaping with the waste gases.

The important industrial progress of my improved process is due to the fact, that now inorganic anhydrous chlorides, including, besides the fixed chlorides which may be produced at temperatures below the fusing points of the respective chlorides, those which are volatile at the temperature of their formation and leave behind a residue of inert material may be produced in large shaft furnaces with heat-insulating lining and without external heating, instead of using, as heretofore, expensive retorts of reduced capacity, and a further advantage of my new process is that the chlorine gas current may be introduced with high velocity and the starting materials are completely utilized.

When a mixture of chlorides is formed by the chlorinating operation, the mixed chlorides escaping from the furnace in the form of vapor may be separately condensed in the well-known manner on account of their different sublimating or boiling points, recourse being taken, if desired, to the known electric dust precipitating methods.

My improved process is applicable to the production of all anhydrous inorganic metal chlorides, especially to the direct production of chlorides from the corresponding oxides naturally occurring as minerals.

Examples 1. 100 parts of beryl ($3 BeO.Al_2O_3.6SiO_2$), and 40 parts of comminuted peat together with a suitable binder are intimately mixed, shaped, dried and carbonized at about 700° C., for instance, in a rotary furnace. The material is then placed in a shaft furnace and chlorine gas is introduced. The reaction soon commences and may be continued without interruption. Beryllium chloride and aluminum chloride distill off and are condensed by fractions, while the residue of the bricks assumes the form of a porous skeleton of silica.

2. 100 parts of clay and 50 parts of peat dust are moistened with water, intimately mixed, dried and carbonized, and while still hot introduced into a shaft furnace and chlorine introduced. The chlorination starts at once. Aluminum, ferric and titanic chlorides are sublimated and condensed in separate chambers. The chlorination may be carried out continuously in direct or counter-current. Porous silica is left as a residue of the bricks and may be intermittently or continuously withdrawn from the shaft furnace.

3. 1000 kilograms of slaked lime are mixed with 600 kilograms of sawdust and well moistened with 900 liters of a calcium chloride solution of 30–33° Bé. The mass is moulded to bricks or similar bodies which are at once or after setting dried and heated until the sawdust is carbonized. The bricks are then, preferably whilst still hot, introduced into a shaft or rotary furnace and subjected to chlorination. After being transformed to bodies of calcium chloride containing a little CaO, the mass is withdrawn from the furnace.

4. 100 parts of chrome iron ore (chromite) containing 50.8% of chromic oxide ($Cr_2O_3$) and 23.5% of ferric oxide ($Fe_2O_3$) are mixed with 70 parts of peat or lignite slack of culm, kneaded with tar as a binding medium and, after suitable shaping, carbonized. By chlorinating the mass at a temperature of about 600° C. anhydrous chromic chloride practically free from iron is obtained as a residue in the furnace. The residue may be withdrawn from time to time or continuously whereas ferric chloride is sublimated away and collected in suitable condensing chambers. The chromic chloride in the residue is easily separated from the coal associated therewith by mechanical or chemical means.

I claim:—

1. In the process of producing anhydrous metal chlorides by interaction of metal oxides and chlorine, the improvement which comprises the steps of forming a mixture comprising an oxide of a metal whose chloride is volatilizable with a binder and an amount of a substance of the group consisting of wood, peat and lignite in comminuted form, capable of producing, when heated, a porosity corresponding at least to the increase in volume caused by the transformation of said metal oxide to solid metal chloride, forming pieces of said mixture, heating said pieces to carbonization and subjecting them, while hot, to chlorination, so as to volatilize the metal chloride formed, the heat of the reaction alone serving to maintain the reaction temperature.

2. In the process of producing anhydrous aluminum chlorides by interaction of aluminum silicate and chlorine, the improvement which comprises the steps of mixing an aluminum silicate with a binder and an amount of a substance of the group consisting of wood, peat and lignite in comminuted form, capable of producing, when heated, a porosity corresponding at least to the increase in volume caused by the transformation of said aluminum silicate to solid aluminum chloride, forming pieces of said mixture, heating said pieces to carbonization and subjecting them, while hot, to chlorination at a high temperature, but below a temperature of 900° C., said temperature being produced by reaction heat.

3. In the process of producing anhydrous aluminum chlorides by interaction of aluminum silicate and chlorine, the improvement which comprises the steps of mixing an aluminum silicate with a binder and an amount of a substance of the group consisting of wood, peat and lignite in comminuted form, capable of producing, when heated, a porosity corresponding at least to the increase in volume caused by the transformation of said aluminum silicate to solid aluminum chloride, forming pieces of said mixture, heating said pieces to carbonization and subjecting them, while hot, to chlorination so as to volatilize the aluminum chloride formed, the heat of the reaction alone serving to maintain the reaction temperature.

4. In the process of producing anhydrous aluminum chlorides which comprises mixing clay with an amount of peat dust, capable of producing, when heated, a porosity corresponding at least to the increase in volume caused by the transformation of said clay to solid aluminum chloride, moistening said mixture and forming pieces of said mixture, heating said pieces to carbonization and subjecting them, while hot, to chlorination, the heat of the reaction alone serving to maintain the reaction temperature.

5. In the process of producing anhydrous metal chlorides by interaction of metal oxides and chlorine, the improvement which comprises the steps of mixing an oxygen compound of a metal of the group consisting of aluminum, beryllium, calcium, chromium, iron and titanium with a binder and an amount of a substance of the group consisting of wood, peat and lignite in comminuted form, capable of producing, when heated, a porosity corresponding at least to the increase in volume caused by the transformation of said metal oxide to solid metal chloride, forming pieces of said mixture, heating said bodies to carbonization and subjecting them, while hot, to chlorination at a high temperature, said temperature being produced by reaction heat.

In testimony whereof I affix my signature.

KARL STAIB.